Patented May 17, 1927.

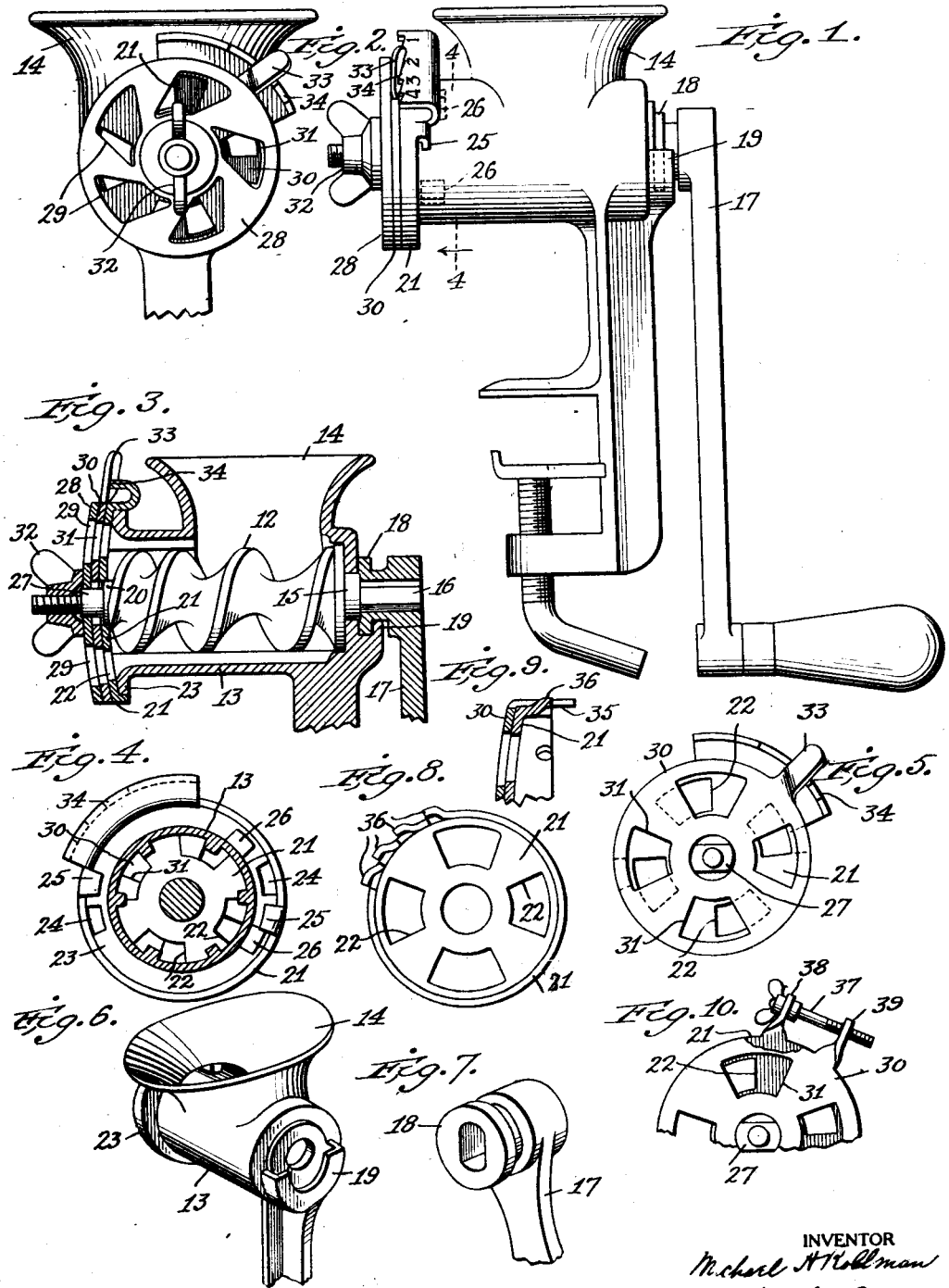
May 17, 1927.
M. A. ROLLMAN
MEAT CHOPPER
Filed May 23, 1925
1,628,998

1,628,998

UNITED STATES PATENT OFFICE.

MICHAEL A. ROLLMAN, OF MOUNT JOY, PENNSYLVANIA.

MEAT CHOPPER.

Application filed May 23, 1925. Serial No. 32,355.

This invention relates to that type of meat chopper in which a screw in a cylindrical casing receives the meat as it descends in the hopper and forces it through a cutting apparatus at the rear end of the casing, the screw being operated by a hand-crank; and the object of the present invention is to so construct the device that it may be inexpensively manufactured and may be readily disassembled for cleaning, as more fully hereinafter set forth.

In the drawing—

Fig. 1 is a side elevation, and

Fig. 2 is a rear elevation of my device;

Fig. 3 is a vertical longitudinal sectional view taken through the hopper;

Figs. 4, 5, 6 and 7 are detail views hereinafter more particularly described;

Figs. 8 and 9 are detail views of a slight modification of the adjusting device;

Fig. 10 is a detail view of another modification of the adjusting device.

Referring to the drawing by reference-characters, 12 designates the screw mounted in the horizontal cylindrical casing 13 and having integrally formed in its upper side a hopper 14. The forward end 15 of the screw-shaft is journaled in a hole in the casing, and its extreme forward end is made angular in cross-section at 16 to receive the operating-crank 17. To lock the crank and the shaft and the casing together, I provide the eye of the crank, on its inner face, with an annular flange 18 which rests in a similarly-shaped groove in the casing, this groove being formed by an upturned arcuate flange 19 cast integral with the casing. When the crank is turned, the flange 18 rotates freely in the groove. This crank-locking means avoids the use of keys and nuts to fasten the crank to the shaft and also provides a ready means of assembling the parts and also disassembling the parts for cleaning.

The rear end 20 of the screw-shaft is journaled in the central hole in a gage-disk 21 provided with a plurality of holes 22 for exit of the meat as it is pushed rearwardly by the screw. This disk is detachably mounted on the cylindrical end of the screw chamber, this end being provided with an annular out-turned flange 23. The flange 23 is provided at diametrically opposite points with rim-notches 24, and the gage-disk 21 is provided with a pair of lugs 25 which are adapted to pass through said notches to engage behind the flange 23 and thus lock the gage-disk 21 to the end of the barrel. To prevent the gage-disk being turned too far in interlocking it with the flange 23, I provide stop-lugs 26. It will be observed that the notches 24 and the lugs 25 provide a sort of bayonet connection between the gage-disk and the barrel and that, therefore, the gage-disk may be readily removed from the end of the barrel to enable the housewife to clean out the barrel as well as clean the screw.

The cutter arrangement is constructed as follows: The screw-shaft, at a point back of the cylindrical part 20, is provided with an angular part 27 which fits in a similarly-shaped central hole in the cutter-disk 28, this cutter-disk being provided with a plurality of exit-openings 29. Between the cutter proper 28 and the gage-disk 21, I provide an additional gage-disk 30, this disk as well as disk 29 being concaved similarly to the gage-disk 21 so as to closely fit each other and said disk 21. The intermediate disk 30 is provided with exit-openings 31. The intermediate disk 30 is provided with an enlarged circular hole which permits this disk to rotate on the angular part 27. By rotating this intermediate disk 30, it will be observed that the openings 31 therein will be caused to more or less overlap the openings in gage-disk 21 and the openings in the cutter-disk 28 to thereby determine the areas of the actual exit openings. The disk 28 is clamped against the other disks by a thumb-nut 32 screwed onto the rear end of the screw-shaft.

To provide for determining the position of the intermediate disk 30 and locking it in its adjusted positions, I provide the same with a radial finger-piece 33, and for the purpose of locking this finger-piece in its adjusted position I provide a notched rack 34 formed integral with the edge of the stationary inner disk 21, the notches being so placed as to provide for desirable adjustments of the gage-disk. With this construction, it will be observed that all the disks may be readily removed from the casing for the purpose of cleaning the interior parts of the apparatus; it will be observed also that manufacture and assembling of the parts will be greatly simplified.

In Figs. 8 and 9, I show a slightly modified arrangement of the locking devices for the gage-disk. In this form of the device, I provide the gage-disk with a forward-turned finger 35 which is adapted to snap over and be interlocked with any one of a series of teeth 36 formed on the forwardly-extending rim of the gage-disk 21. In Fig. 10, I show still another modification of the adjusting device; in this modification I provide an adjusting-screw 37 mounted rotatively in a lug 38 carried by the gage-disk 21 and tapped in a hole in a lug 39 formed integral with the gage-disk 30.

It will be understood that the rearward pressure of the meat against the screw will hold the rear end of the screw in abutting relation with the rear wall of the hopper. It will be observed that the inner disk 21 serves as a journal for the shaft 20 of the screw and also that the forward end of the screw abuts the inner face of the disk 21 to thereby form an abutment to receive the thrust due to the clamping action of the thumb-nut 32. It must be understood, however, that the clamping of the thumb-nut is not sufficiently tight to prevent the cutter-disk 29 rotating freely with the screw, the other two disks being of course held stationary on the hopper. The lugs 25 hold the inner disk 21 against rotation while the finger 33 is sufficient to hold the intermediate disk against rotation.

This application is virtually a renewal of my forfeited application Serial No. 697,033, filed March 5, 1924, allowed April 17, 1924.

What I claim as new is:

1. In a meat chopper, a casing and a screw therein, a cutting appliance at the rear end of the screw chamber embodying a gage-disk provided with exit openings and means for removably locking said gage-disk to the casing, an intermediate rotatable gage-disk and means for rotatively adjusting it and locking it in its adjusted positions, and a cutter-disk on the rear face of the rotatable disk.

2. In a meat chopper, a casing, a screw therein, a removable gage-disk carried by the casing and provided with exit openings, an adjustable gage-disk behind the aforesaid gage-disk, and a cutter-disk behind this last-named gage-disk, this cutter-disk being fastened to the shaft of the aforesaid screw.

3. A meat mincer of the type wherein a rotary screw is mounted in a cylindrical hopper for forcing meat to a rotary cutter mounted on the screw, characterized by the employment of an inner gage-disk removably mounted on the exit end of the hopper and serving as a journal for the forward end of the shaft of the screw, another gage-disk lying against the outer face of the aforesaid gage-disk and devices for rotatively adjusting this disk with respect to the stationary gage-disk, a cutter-disk mounted on the screw-shaft and adapted to rotate therewith and lie against the outer face of the last-named gage-disk, and a thumb-nut for clamping this cutter-disk against the gage-disks.

4. A meat-mincing machine according to claim 2, characterized in that the means for removably locking the inner gage-disk removably to the casing consists in providing said disk with an inwardly-extending annular flange embracing an annular flange on the casing, these two flanges being provided with interlocking lugs and notches together with stop-lugs.

5. A meat-cutter embodying a barrel and a screw and means for turning the screw, the screw being journaled in the barrel at its rear end, a gage-disk fixed to the forward end of the barrel provided with openings for the passage of the meat and serving as a journal for the forward end of the screw-shaft, a second fixed gage-disk rotatively mounted on the aforesaid gage-disk and means for locking this adjustable gage-disk in its adjusted positions, and a cutter affixed to the shaft of the screw and bearing against the outer face of the outer gage-disk.

In testimony whereof I hereunto affix my signature.

MICHAEL A. ROLLMAN.